(12) United States Patent
Silny et al.

(10) Patent No.: US 8,913,243 B2
(45) Date of Patent: Dec. 16, 2014

(54) POLARIMETRIC CALIBRATION OF A REMOTE SENSOR

(71) Applicant: Raytheon Company, Waltham, MA (US)

(72) Inventors: John F. Silny, Playa Del Rey, CA (US); Stephen J. Schiller, La Miranda, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/671,048

(22) Filed: Nov. 7, 2012

(65) Prior Publication Data

US 2014/0055785 A1    Feb. 27, 2014

Related U.S. Application Data

(60) Provisional application No. 61/693,025, filed on Aug. 24, 2012.

(51) Int. Cl.
*G01J 4/00*    (2006.01)

(52) U.S. Cl.
USPC .......................................... 356/364; 356/369

(58) Field of Classification Search
CPC .... B60R 1/088; G01C 15/004; G01C 19/667; G01D 5/345; G01D 5/38; G01D 5/30; G01S 17/06; G01S 17/74; G01J 1/4257; G02B 26/06; G02B 26/0833; G02B 27/0068; G03F 7/70116; G03F 7/70258; G03F 7/703
USPC ............... 356/364, 369, 367; 250/252.1, 216, 250/253, 200; 359/627, 621, 619, 629, 631
See application file for complete search history.

(56) References Cited

U.S. PATENT DOCUMENTS 8,339,577 B2 * 12/2012 Xalter et al. .................... 355/68
2010/0032557 A1    2/2010 Schiller

OTHER PUBLICATIONS

Schiller, et al., "In-Flight Vicarious Calibration of High Spatial Resolution Remote Sensing Systems Using Specular Reflectors," JACIE Civil Commercial Imagery Evaluation Workshop, Mar. 18, 2009, pp. 1-30.
Tyo, et al., "Review of passive imaging polarimetry for remote sensing applications," Applied Optics, Optical Society of America, Washington, DC, US, vol. 45, No. 22, Aug. 1, 2006, pp. 5453-5469.
Vedel, et al., "Full Stokes polarization camera," Spie Proceedings, Optical Engineering & Applications, vol. 8160, No. 33, Dec. 31, 2011, XP7922122, p. 2, paragraph 4.1-p. 4, paragraph 4.3.

* cited by examiner

*Primary Examiner* — Tri T Ton
(74) *Attorney, Agent, or Firm* — Burns & Levinson LLP; Joseph M. Maraia

(57) ABSTRACT

Described are methods and systems for vicarious polarimetric calibration and performance validation of a remote sensor. The system includes a plurality of reflective mirrors configured and arranged to reflect radiation from a source of radiation onto the remote sensor with accurately known polarimetric properties. Each of the reflective mirrors are located so that the target images do not overlap. The remote sensor is configured to receive the radiation reflected from the plurality of reflective mirrors and store the received radiation as image data (e.g., the image of each mirror appears as a point target). The system includes a processor configured to process the received data to provide direct calibration and performance validation for each polarimetric or spectral channel of the remote sensor. In addition, the calibration method removes all atmospheric effects except for transmittance and provides reference targets that have high polarimetric contrast, full spectrum performance and easy to deploy.

5 Claims, 8 Drawing Sheets

POLARIMETRIC CALIBRATION OF A REMOTE SENSOR

RELATED APPLICATION

This application claims the benefit of U.S. Provisional Application No. 61/693,025, filed on Aug. 24, 2012. The entire teachings of the above application are incorporated herein by reference.

BACKGROUND

A critical element in the operation of air-borne and space-borne imaging systems is sensor calibration on the ground before launch or flight. The purpose is to provide a complete characterization of a sensor's spectral, spatial, temporal, radiometric and polarization response functions. This is true for radiometric instruments designed to measure scene radiance at multiple wavelengths (imaging radiometers) or those specifically designed to measure the polarization properties in the radiation from objects in the scene (imaging polarimeters). In both cases, laboratory measurements are generally performed to quantify the effects of the instruments polarized response achieving performance characterization or calibration in supporting their overall measurement objectives.

For imaging radiometers, polarimetric characterization is desired for each spectral channel. Ideally, their polarization response should be nonexistent with the radiometric response independent of whether any of the radiation recorded from a source is polarized or not. But in many cases, polarization responsivity becomes present through the use of optical components such as off-axis mirrors, mirror coatings, beam splitters or diffraction gratings.

In contrast, polarimeters require polarimetric calibration. Imaging polarimetry is dedicated to mapping the state of polarization across a scene of interest. The properties of polarized radiation (i.e. unpolarized, partially polarized or completely polarized) are generally described by a four-element real vector known as Stokes vector. The symbols $S_0$, $S_1$, $S_2$ and $S_3$ represent the four Stokes-vector elements. The first three elements describe linear polarization and are determined from a minimum of three images recorded through polarizing filters at different rotation angles. Generally, the elements are calculated from a set of orthogonal intensity terms recorded in four images of a scene each through polarizers oriented at angles of −45, 0, 45 and 90 degrees. The calibration process derives coefficients for transformation equations that convert the intensity measurements into Stoke-vector elements.

Calibration performance for remote sensing systems is generally best known when analyzed during ground testing. However, it is entirely possible that physical conditions within the imaging system (including any on-board calibrators) or in the atmosphere between the imaging system and the desired target may change from the calibration laboratory setting in such a way so as to skew the performance knowledge or calibration values. The calibration performance thus becomes suspect until validated after deployment.

Under operational conditions, validation requires the use of vicarious calibration sources that function independent of the previous laboratory testing or on-board calibrators. Prior art has consisted of: 1) vicarious polarimetric references established through field campaigns to characterize the polarimetric state of natural targets, 2) deploying large man-made non-Lambertian surfaces, 3) spotlights shining through polarizers, or 4) modeling scattered sunlight in the atmosphere. These approaches have either proven very costly or have achieved very limited accuracy and reproducibility. Thus, a need exists in the art for improved systems and methods for polarimetric calibration of remote sensors.

SUMMARY

Systems and methods for polarimetric calibration of remote sensors include technology that, generally, enables polarimetric calibration and performance validation of a remote sensor using a set of mirror reflectors (also referred to as reflective mirrors). The reflectors can be convex, concave, and/or flat and can be placed on the ground of the Earth or any other surface (e.g., Moon, satellite, etc.). The polarimetric properties of the mirrors are accurately known based on measurements of the mirrors parallel (s) and perpendicular (p) reflectance components and may be modified in a known way by having polarimetric filters placed over their reflecting surfaces or coating their reflecting surfaces with birefringent materials. The set of mirror reflectors are placed onto the surface in a particular arrangement to form an array of polarimetric reference targets (e.g., multiple reflectors may be places with specific spacing into a surface to form an array). Each of the targets may consist of one or more mirror reflectors.

The technology includes a remote sensor (e.g., electro-optical sensor, infrared sensor, etc.) that receives reflected radiation from the set of mirror reflectors. For instance, the remote sensor while in-flight (either airborne or spaceborne) images the mirror reflectors (e.g., mirror array). In particular, sunlight or other illumination is reflected from the mirror array to an aperture of the remote sensor. The image of each reference target of the mirror array appears as a point target within the acquired image date (i.e., reflection data).

In general, the array will contain reference targets of different brightness with the upwelling total intensity of an individual target proportional to the number of mirrors contained in the target, Data processing then provides direct calibration for each polarimetric channel of the remote sensor, including removal of atmospheric effects and measurements of response linearity over the sensor's calibrated dynamic range. The technology advantageously enables polarimetric calibration and performance validation for remote sensors during operational use of the remote sensor (e.g., air-borne use, space-borne use, etc.), thereby increasing the functional use of the remote sensor and reducing the uncertainty with image data from the remote sensor.

A plurality of reflective mirrors are configured and arranged to reflect radiation from a source of radiation onto the remote sensor. The remote sensor is configured to receive the radiation from the plurality of reflective mirrors through an optical system. For each of the plurality of reflective mirrors or multiple mirror reference targets, the remote sensor stores response signals of the received radiation. Using the response signals of the received radiation, an embodiment: (1) characterizes how well a polarimetric sensor performs (e.g., does the sensor report the correct polarimetric metric when viewing the mirror targets), and/or (2) characterizes how much polarization sensitivity a non-polarimetric sensor has (e.g., demonstrates how much undesired variation occurs when imaging a highly polarized mirror target).

One approach is a system that provides vicarious polarimetric calibration of remote sensors. The system includes a processor that is configured to receive image data collected at a remote sensor, the image data including a plurality of image elements each associated with a respective reflective mirror from a plurality of reflective mirrors. In addition, the processor is configured, for example, to determine one or more Stokes vector elements and one or more polarimetric calibration metrics of the received radiation from the response signals of each of the plurality of reflective mirrors, and determine an angle of linear polarization (AOLP), a degree of polarization (DOP), a degree of linear polarization (DOLP), a degree of circular polarization (DOCP), or any combination thereof based on the one or more Stokes vector elements and one or more polarimetric calibration metrics.

Another approach is a mirror array for polarimetric calibration of a remote sensor. The mirror array comprises a plurality of reflective mirror targets, that may consist of one or more mirrors, configured and arranged to reflect neutral or polarized radiation from a source of radiation onto the remote sensors. Each of the plurality of reflective mirrors reflects light that is polarized to a known set of polarization metrics. In addition, each of the mirrors has a radius of curvature that provides control of an intensity of the reflected radiation. The reflected radiation is utilized to calibrate a remote sensor based on a known at-sensor intensity for each of the plurality of reflective mirror targets and one or more known polarization metrics of the reflected radiation for the respective target. It should be noted the mirror array may be defined as an array of polarimetric reference targets. In this situation, each target in the array, in general, consists of a different number of mirrors. However, regardless of the number of mirrors in each target, each target appears as a point source or pseudo point source in image data captured from the remote sensor from the reflected radiation.

Another approach is a method for polarimetric calibration of a remote sensor. The method includes receiving radiation reflected from a plurality of reflective mirror targets, wherein the reflected radiation from each of the plurality of mirrors is polarized. For each of the plurality of reflective mirrors, the method further determines one or more combined polarization properties of the source of radiation and the respective mirror. In addition, the method, for each of the plurality of reflective mirrors, determines one or more polarimetric calibration metrics based on the determined combined polarization of the reflected radiation.

Yet another approach is a system for calibration of a remote sensor. The system comprises a remote sensor that is configured to receive radiation reflected from a plurality of reflective mirrors through an optical system. The remote sensor is further configured to store, for each of the plurality of reflective mirrors, response signals of the received radiation. Also, the system includes a processor configured to determine one or more calibration metrics based on the received radiation from the response signals for each of the plurality of reflective mirrors In other examples, any of the approaches above can include one or more of the following features.

In some examples, the processor is further configured to generate sensor polarimetric signal calibration coefficients based on the one or more polarimetric calibration metrics. The one or more sensor polarimetric calibration metrics may be utilized to characterize one or more polarimetric perturbations in received image data. In addition, the response signals over a dynamic range may be indicative of response linearity of the remote sensor.

In other examples, the one or more polarimetric perturbations may comprise a radiometric calibration error, an optical element spatial polarimetric nonuniformity, an optical axis and element rotation and alignment error, an optical and polarization aberrations and registration error between polarimetric channels, or any combination thereof.

In yet another example, the processor may further be configured to determine, for each polarimetric channel of a plurality of polarimetric channels, one or more channel calibration coefficients based on the known polarization state of the reflected radiation from each of the plurality of reflective mirrors and the known polarization state of the received radiation from the respective reflective mirror.

The processor may also further be configured to determine a reference orientation of a remote sensor polarization axis relative to a line of sight of the plurality of reflective mirrors, and rotate a reference axis of the reflected radiation from each of the plurality of reflective mirrors based on the sensor axis orientation.

In other examples, the processor may be further configured to determine, for each of the plurality of reflective mirrors, a radiometric offset for the source of radiation based on a path radiance contribution to the reflected radiation, and modify, for each of the plurality of reflective mirrors, the one or more polarimetric calibration metrics based on the radiometric offset.

In some examples, the one or more polarimetric calibration metrics may comprise a principal axis orientation metric, a calibration residual metric, an atmospheric compensation residual metric, or any combination thereof. In addition, the one or more of the plurality of reflective mirrors may comprise a circular polarization filter/retarder, a linear polarization filter, a polarization orientation filter, or any combination thereof. Further, each of the plurality of reflective mirrors may be polarized to a different set of polarization metric values. Also, each of the plurality of reflective mirrors may have a radius of curvature, where the radius of curvature provides control of an upwelling intensity of the reflected radiation. The one or more of the plurality of reflective mirrors may be a convex spherical mirror.

In another example, a sensor polarimetric calibration metric may be generated based on the one or more polarimetric calibration metrics of each of the plurality of reflective mirrors. In addition, a channel calibration metric, for each polarimetric channel of a plurality of polarimetric channels, may be determined based on the one or more polarization metrics of the reflected radiation from each of the plurality of reflective mirrors and one or more polarization metrics of the light reflective from the respective mirror.

In other examples, the processor may be further configured to generate sensor signal calibration coefficients based on the one or more calibration metrics. In addition, the one or more sensor calibration metrics may be utilized to characterize one or more polarimetric perturbations in received image data. The processor may also be further configured to determine a calibration coefficient based on a degree of polarization (DOP) for each of the plurality of reflective mirrors and the known polarization state of the reflected radiation from each of the plurality of reflective mirrors.

The polarimetric calibration techniques described herein can provide one or more of the following advantages. An advantage of the technology is that the polarimetric calibration utilizing known reflective mirrors enables calibration for the remote sensor during in-flight operations, thereby reducing errors with the remote sensor. Another advantage of the technology is that the polarimetric calibration utilizing known reflective mirrors enables calibration for the remote sensor during in-flight operations, thereby decreasing maintenance costs associated with retrieval of the remote sensor. A further advantage is that the technique removes the polarized sky path radiance as a contributor to the reference calibration signal; thereby, improving calibration accuracy. Yet another advantage of the technology is that it provides a low cost, reliable, and accurate solution for the calibration and performance evaluation of remote sensors. In addition, the technology provides: i) high-contrast, full spectrum, highly polarized targets (which are not easily found in natural scenes) and ii) easy-to-deploy and easy-to-maintain solutions for the calibration and performance evaluation of remote sensors.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A vicarious polarimetric calibration method and apparatus includes technology that, generally, utilizes a plurality of reflective mirrors (e.g., reflectors) to calibrate and/or validate performance of a remote sensor. The reflectors may be convex, concave, or flat. In addition, the reflectors may have polarimetric filters placed over their reflecting surfaces. The reflectors may be placed on the ground of the Earth or any other surface (e.g., Moon, Satellite, etc.). The reflectors may have a spacing between themselves to prevent their images in data from overlapping. The technology includes a remote sensor (e.g., electro-optical sensor, infrared sensor, etc.) that receives reflected radiation from the set of mirror reflectors. For instance, the remote sensor while in-flight (either airborne or spaceborne) images the mirror reflectors (e.g., mirror array). In particular, sunlight or other illumination is reflected from the mirror array to an aperture of the remote sensor. The image of each mirror of the mirror array appears as a point target or a pseudo point target within the acquired image date (i.e., reflection data). Data processing then provides direct calibration for each polarimetric channel of the remote sensor, including removal of atmospheric effects and measurements of response linearity. The technology advantageously enables polarimetric calibration and performance validation for remote sensors during operational use of the remote sensor (e.g., air-borne use, space-borne use, etc.), thereby increasing the functional use of the remote sensor and reducing the uncertainty with image data from the remote sensor. In addition, the technology advantageously enables a sensor to be remotely calibrated (e.g., air-borne, space-borne, etc.), thereby reducing on-board hardware and maintenance costs. The technology also advantageously enables a sensor to be remotely validated, thereby increasing the confidence of the image data from the sensor.

Figure 1:
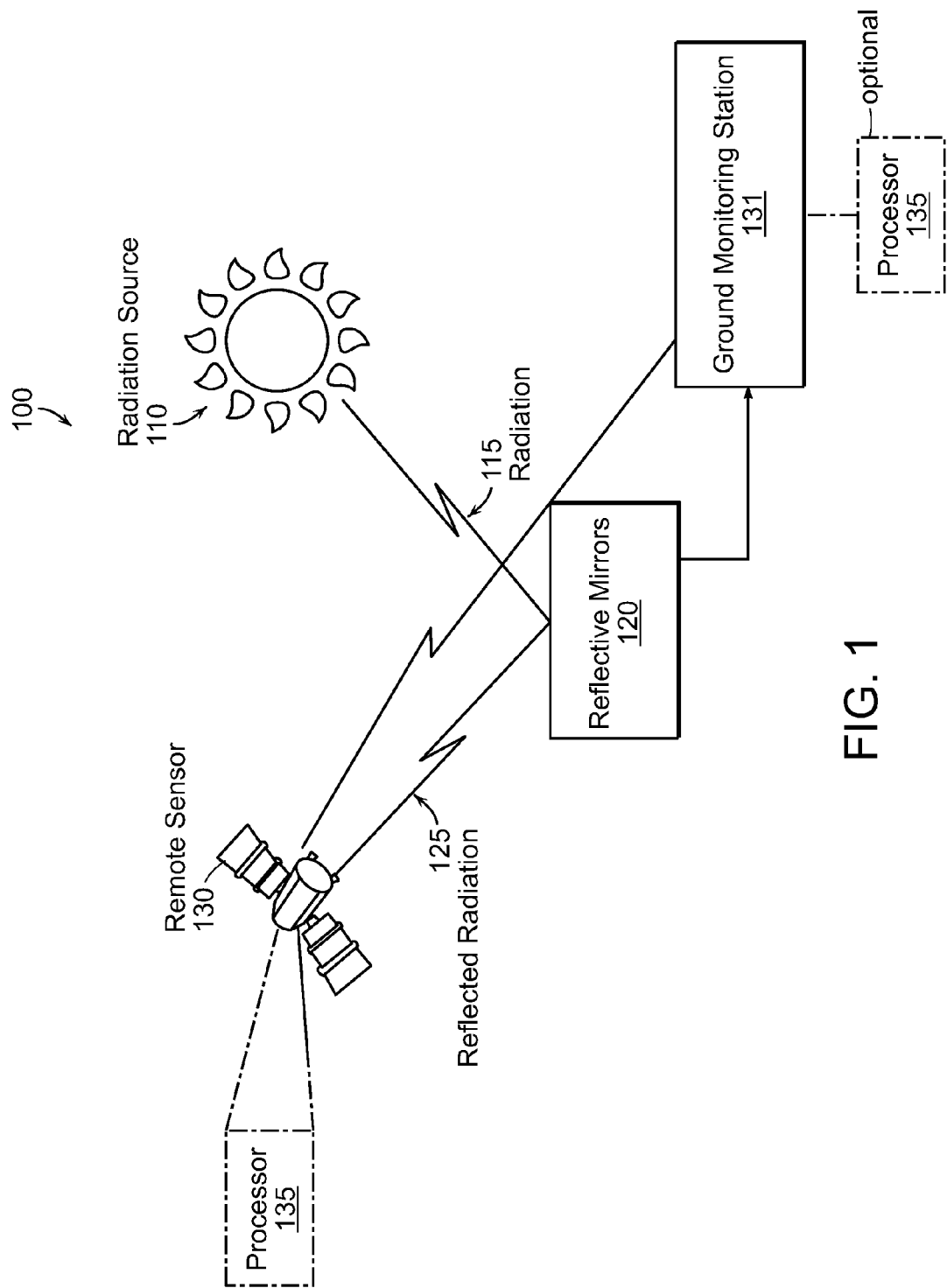
FIG. 1 is a diagram of an exemplary polarimetric calibration environment.

FIG. 1 is a diagram of an exemplary polarimetric calibration environment 100. The environment 100 includes a radiation source 100 (in this example, the sun), a plurality of reflective mirrors 120, and a remote sensor 130. In some examples, the remote sensor 130 includes a processor 135. Although, the processor 135 is illustrated as being included in the remote sensor 130, it should be noted that, in other examples, the processor may located on another system (e.g., inter-connected calibration system, remote calibration system, on-ground monitoring system 131, etc.). It should also be noted that there are other potential radiation sources other than the sun. For example, the radiation source may be a laser that is used to illuminate the mirrors or emission from the atmosphere.

As illustrated in FIG. 1, the radiation source 100 emits radiation 115. The plurality of mirrors 120 reflects the radiation 115, and the reflected radiation 125 is received by the remote sensor 130. In other words, the plurality of reflective mirrors 120 are arranged to reflect the radiation 115 from the source of radiation (also referred to as radiation source 110) onto the remote sensor 130.

The remote sensor 130 receives the radiation (also referred to as reflected radiation 125) reflected from the plurality of reflective mirrors 120. For instance, the remote sensor 130 receives the radiation reflected 125 from the plurality of reflective mirrors 120 through an optical system (not shown) that may comprise retarders and polarizers. The remote sensor 130 stores response signals of the received radiation 125. The remote sensor 130 may store the data as image data (e.g., converts the received radiation into the image data, stores the image data, transmits the image data, etc.). The processor 135 determines, for each of the plurality of reflective mirrors 120, one or more Stokes vector elements and one or more polarimetric calibration metrics of the received radiation 125 from the response signals for each polarimetric channel of each of the plurality of reflective mirrors 120. As stated above, the processor 135 may be located at a ground monitoring station 131. In such a scenario, the remote sensor 130 sends the image data to the ground monitoring station 131 (e.g., the processor 135). The polarimetric calibration metrics may comprise a principal axis orientation metric, a calibration residual metric, an atmospheric compensation residual metric, or any combination thereof. In addition, the processor 135 may determine an angle of linear polarization (AOLP), a degree of polarization (DOP), a degree of linear polarization (DOLP), a degree of circular polarization (DOCP), or any combination thereof based on the one or more Stokes vector elements and one or more polarimetric calibration metrics. In other words, the processor 135 can determine if the remote sensor 130 is accurately capturing the polarimetric signature of the reflector mirrors 120. The determination enables the remote sensor 130 and/or the operator of the remote sensor 130 to validate the performance during operation (e.g., airborne operation, space-borne operation, etc.), thereby reducing maintenance costs associated with calibrating the remote sensor 130.

In some examples, the processor 135 generates sensor polarimetric signal calibration coefficients based on the one or more polarimetric calibration metrics. In addition, the one or more polarimetric calibration metrics may be used by the processor 135 to characterize one or more polarimetric perturbations in received image data. In some examples, the one or more polarimetric perturbations comprise a radiometric calibration error, an optical element spatial polarimetric non-uniformity, an optical axis and element rotation and alignment error, an optical and polarization aberrations and registration error between polarimetric channels, or any combination thereof.

The processor 135 may determine response linearity of the remote sensor 130 where the response signals over a dynamic range are indicative of response linearity of the remote sensor. The response may be assessed for each polarimetric channel.

In some examples, the processor 135 determines, for each polarimetric channel of a plurality of polarimetric channels, one or more channel calibration coefficients based on the known polarization state of the reflected radiation 125 from each of the plurality of reflective mirrors 120 and the known polarization state of the received radiation from the respective mirror.

In some examples, the processor 135 determines a reference orientation of a remote sensor polarization axis relative to a line of sight of the plurality of reflective mirrors 120. In addition, the processor 135 rotates a reference axis of the reflected radiation from each of the plurality of reflective mirrors based on the sensor axis orientation.

In another example, the processor 135 determines, for each of the plurality of reflective mirrors, a radiometric offset for the source of radiation based on a path radiance contribution to the reflected radiation. In addition, the processor 135, for each of the plurality of reflective mirrors, modifies the one or more polarimetric calibration metrics based on the radiometric offset.

In other examples, one or more of the plurality of reflective mirrors 120 comprise a circular polarization filter/retarder, a linear polarization filter, a polarization orientation filter, or any combination thereof. Further, each of the plurality of reflective mirrors 120 may be polarized to a different set of polarization metric values. In addition, the each of the reflective mirrors 120 may have a radius of curvature that provides control of an upwelling intensity of the reflected radiation 125. In other embodiments, the reflective mirrors 120 are convex spherical mirrors.

In an embodiment, the reflective mirrors 120 are an array of mirrors for polarimetric calibration of the remote sensor 130. In particular, the reflective mirrors 120 are configured and arranged to reflect neutral or polarized radiation from a source of radiation onto the remote sensor 130. For instance, the reflective mirrors 120 reflect light that is polarized to a known set of polarization metrics. In this case, each of the reflective mirrors 120 have a radius of curvature that provides control of an intensity of the reflected radiation 125. The reflected radiation 125 is then utilized to calibrate the remote sensor 130 based on a known at-sensor intensity for each of the plurality of reflective mirrors and one or more known polarization metrics of the reflected radiation 125 for the respective reflective mirror.

Figure 2A:
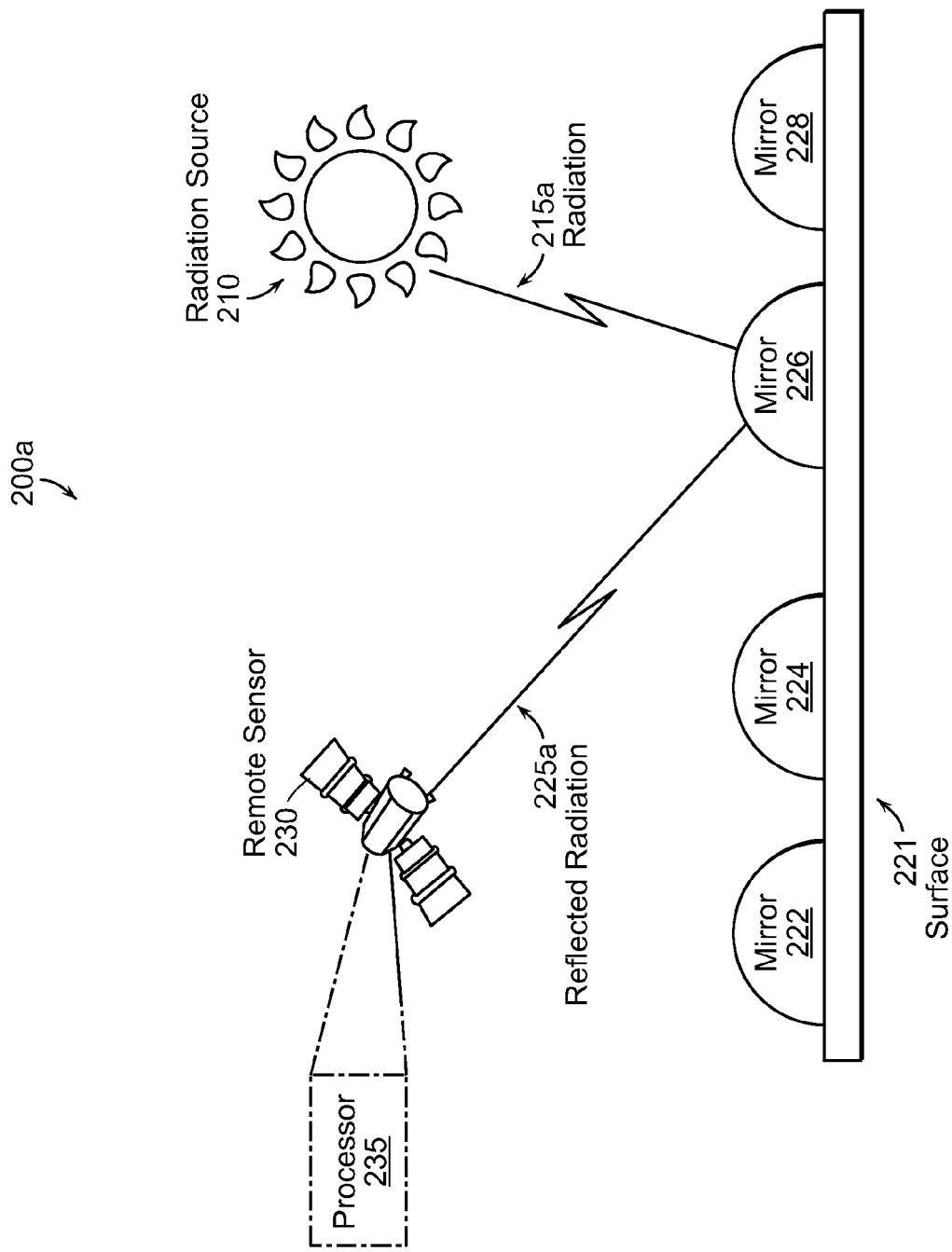
FIGS. 2A and 2B are diagrams of an exemplary polarimetric calibration environment.
Figure 2B:
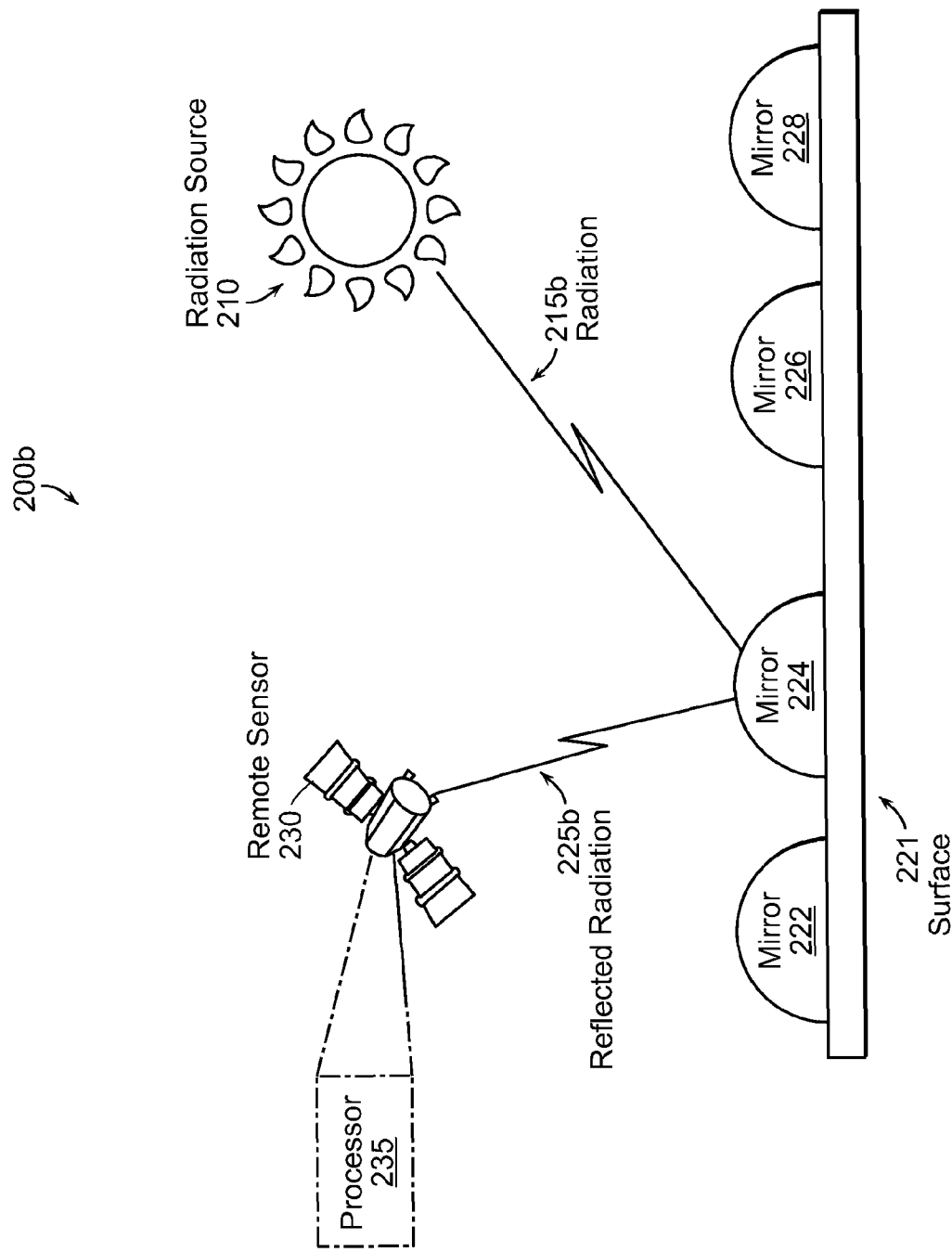

FIGS. 2A-2B are diagrams of an exemplary polarimetric calibration environment 200a and 200b. The environment 200 includes a radiation source 200 (in this example, the sun), a plurality of reflective mirrors 222, 224, 226, and 228, and a remote sensor 230. The plurality of reflective mirrors 222, 224, 226, and 228 are on a surface 221 (e.g., earth, a satellite, moon, etc.). In some examples, the remote sensor 230 includes a processor 235. In other examples and as illustrated in FIG. 1, the processor 235 is located on another system (e.g., inter-connected calibration system, remote calibration system, ground monitoring station 131, etc.).

As illustrated in FIG. 2A, the radiation source 210 emits radiation 215a. The mirror 226 reflects the radiation 215a, and the reflected radiation 225a is received by the remote sensor 230. In other words, the mirror 226 is arranged to reflect the radiation 215a from the source of radiation (also referred to as radiation source 210) onto the remote sensor 230.

As illustrated in FIG. 2B, the radiation source 210 emits radiation 215b. The mirror 224 reflects the radiation 215b, and the reflected radiation 225b is received by the remote sensor 230. In other words, the mirror 224 is arranged to reflect the radiation 215b from the source of radiation (also referred to as radiation source 210) onto the remote sensor 230.

The remote sensor 230 receives the radiation (also referred to as reflected radiation 225a and 225b) reflected from the plurality of reflective mirrors 226 and 224, respectively. The remote sensor 230 stores the received radiation. The processor 235 determines one or more Stokes vector elements and one or more polarimetric calibration metrics of the received radiation from the response signals for each polarimetric channel of each of the plurality of reflective mirrors. In addition, the processor 135 determines an angle of linear polarization (AOLP), a degree of polarization (DOP), a degree of linear polarization (DOLP), a degree of circular polarization (DOCP), or any combination thereof based on the one or more Stokes vector elements and one or more polarimetric calibration metrics.

Figure 3:
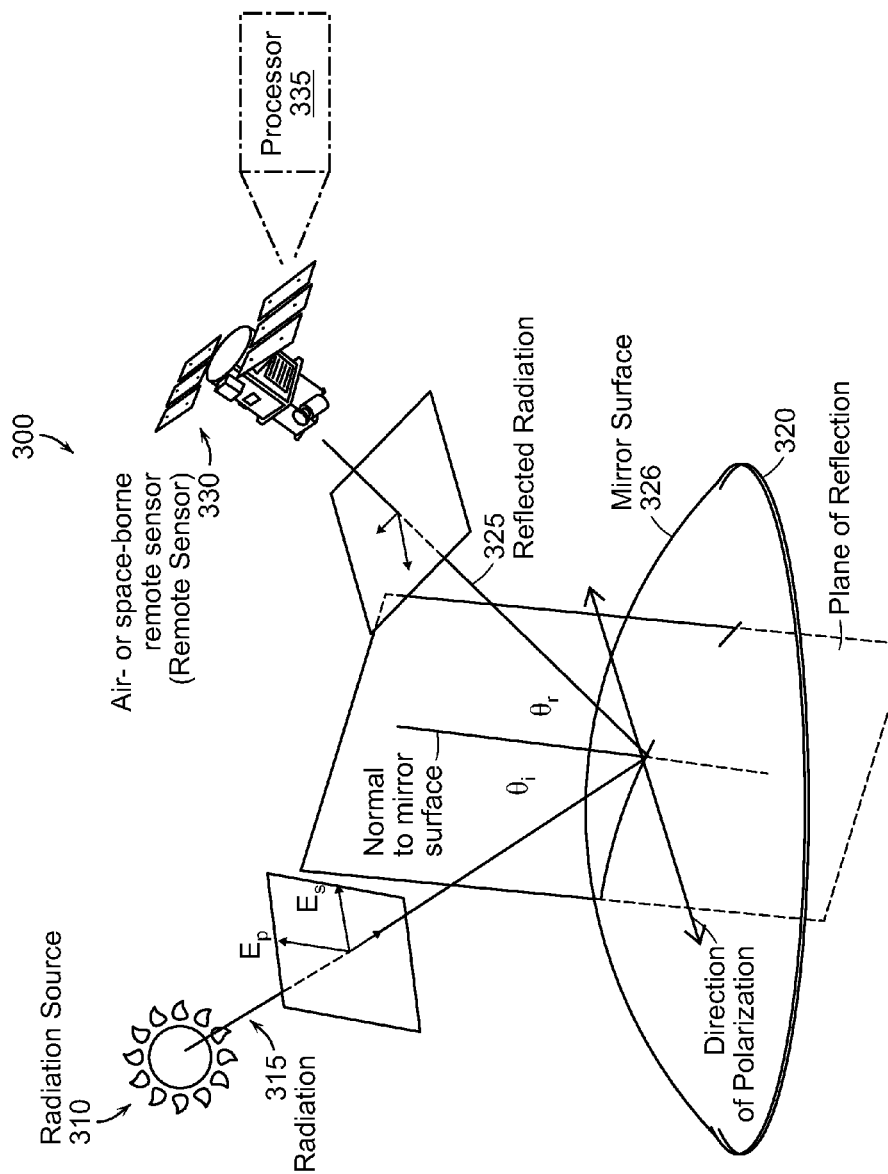
FIG. 3 is a diagram of an environment for the production of the polarimetric state of reflected radiation by a specular convex mirror.
Figure 4:
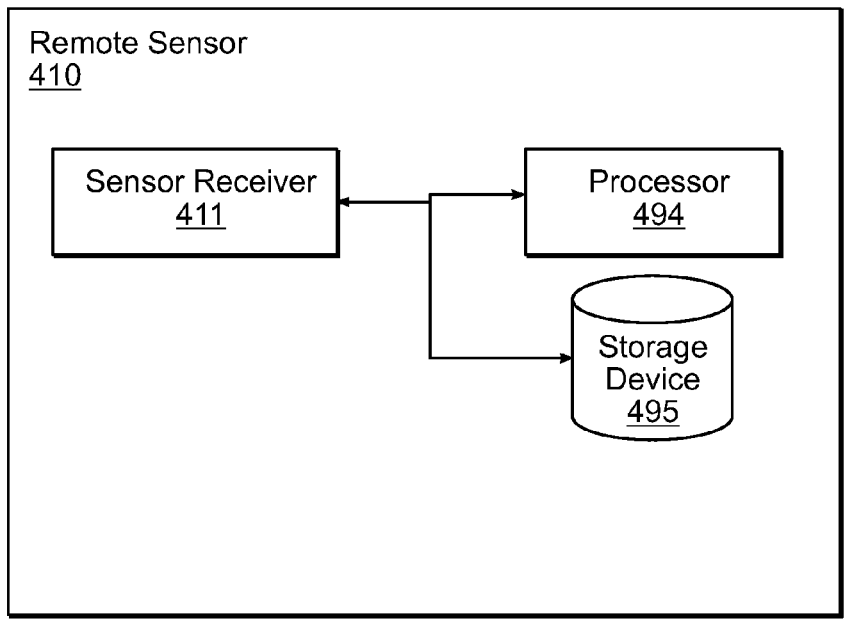
FIG. 4 is a diagram of an exemplary remote sensor.

FIG. 3 is a diagram that illustrates an environment 300 for the production of the polarimetric state of reflected radiation 325 by a specular convex mirror(s) 320. The mirror 320 receives radiation 315 from a radiation source 310 that can be represented as plane waves in which the magnitude of the parallel ($E_s$) and perpendicular ($E_p$) electric field components are equal so that the incident radiation is unpolarized. The corresponding reflectance of the radiation for the parallel and perpendicular components are $\rho_s$ and $\rho_p$, respectively. The radiation is reflected at the location on the mirror where the angle of incidence ($\theta_i$) equals the angle of reflection ($\theta_r$) such that the reflected radiation 325 is directed on a line directly towards the air- or space-borne remote sensor 330. The incident and reflected rays, along with the resulting normal to the mirror surface 326, are all co-planer defining the plane of reflection. The magnitude of the reflectance $\rho_s$ and $\rho_p$ depend on the material used for the reflective coating but, in general, is not equal to each other with $\rho_s > \rho_p$. As a result, the electric field vectors, moving toward the remote sensor 330 as a plane wave, are no longer equal. The reflected radiation is now polarized, forming an ellipse with the major axis aligned perpendicular to the plane of reflection. For the polarized radiation reaching the sensor 330, the degree of linear polarization (DOLP)=$(\rho_s-\rho_p)/(\rho_s+\rho_p)$ and angle of linear polarization (AOLP) is equal to the angle of the major axis of the polarization ellipse. The mirror(s) 320 are now polarimetric validation reference targets with a DOLP and AOLP known simply from the mirror reflectance components and the radiation source 310 and remote sensor 330 elevation and azimuth. Sensor calibration validation is achieved by comparing the target DOLP and AOLP with the DOLP and AOLP derived from the laboratory calibration and processor analysis of the sensor polarimetric band images such that DOLP=$\sqrt{(S_1^2+S_2^2)}/S_0$ and AOLP=$\frac{1}{2} \arctan(S_2/S_1)$ based on the first three Stokes vector elements FIG. 4 is a diagram of an exemplary remote sensor 410. The remote sensor 410 includes a sensor receiver 411, a processor 494, and a storage device 495. The devices described herein can, for example, utilize the processor 494 to execute computer executable instructions and/or include a processor to execute computer executable instructions (e.g., an encryption processing unit, a field programmable gate array processing unit, etc.). It should be understood that the remote sensor 410 can include, for example, other modules, devices, and/or processors known in the art and/or varieties of the illustrated modules, devices, and/or processors. As stated above, in reference to FIG. 1, the processor 494 may be located in a separate apparatus. For example, in a ground monitoring station 131.

The sensor receiver 411 receives radiation reflected from a plurality of reflective mirrors. Each of the plurality of reflective mirrors is located at a known position.

The processor 494 determines one or more Stokes vector elements and one or more polarimetric calibration metrics of the received radiation from the response signals for each polarimetric channel of each of the plurality of reflective mirrors. In addition, the processor 494 determines an angle of linear polarization (AOLP), a degree of polarization (DOP), a degree of linear polarization (DOLP), a degree of circular polarization (DOCP), or any combination thereof based on the one or more Stokes vector elements and one or more polarimetric calibration metrics.

In some examples, the plurality of reflective mirrors are located on the earth's surface or a satellite different from the satellite on which the remote sensor is located. In other examples, the remote sensor is located on an airborne platform, an airship platform, or a space borne platform. In some examples, the remote sensor is located on a ground based platform.

The storage device 495 stores image data and/or any other information (e.g., metric, coefficient, etc.). The storage device 495 can include a plurality of storage devices and/or the remote sensor 410 can include a plurality of storage devices (e.g., an image storage device, a position storage device, etc.). The storage device 495 can include, for example, long-term storage (e.g., a hard drive, a tape storage device, flash memory, etc.), short-term storage (e.g., a random access memory, a graphics memory, etc.), and/or any other type of computer readable storage.

Figure 5:
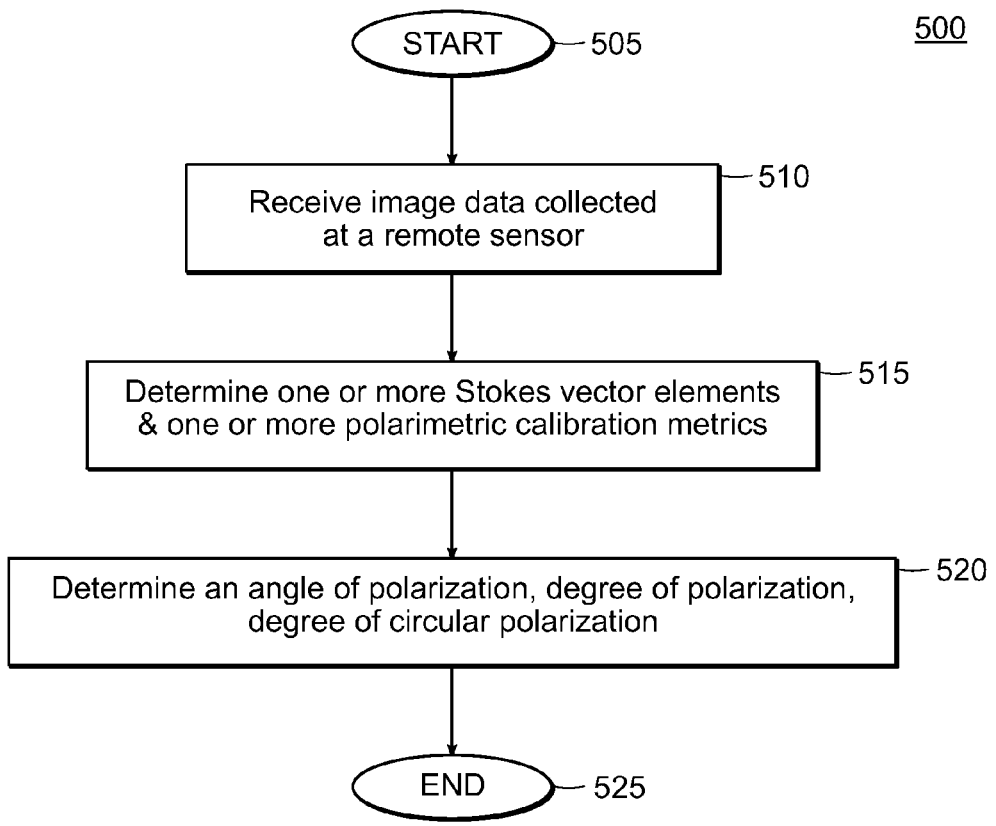
FIG. 5 is a flowchart of an exemplary polarimetric calibration method.

FIG. 5 is a flowchart of an exemplary polarimetric calibration method 500 of, for example, the remote sensor 130 of FIG. 1. The method 500 begins at 505. At 510, the method 500 receives image data collected at the remote sensor 130. At 515, the method 500 determines one or more Stokes vector elements and one or more polarimetric calibration metrics of the received radiation from the response signals for each polarimetric channel of each of the plurality of reflective mirrors. In addition, the method 500, at 520, determines an angle of linear polarization (AOLP), a degree of polarization (DOP), a degree of linear polarization (DOLP), a degree of circular polarization (DOCP), or any combination thereof based on the one or more Stokes vector elements and one or more polarimetric calibration metrics. At 525, the method 500 ends.

Figure 6A:
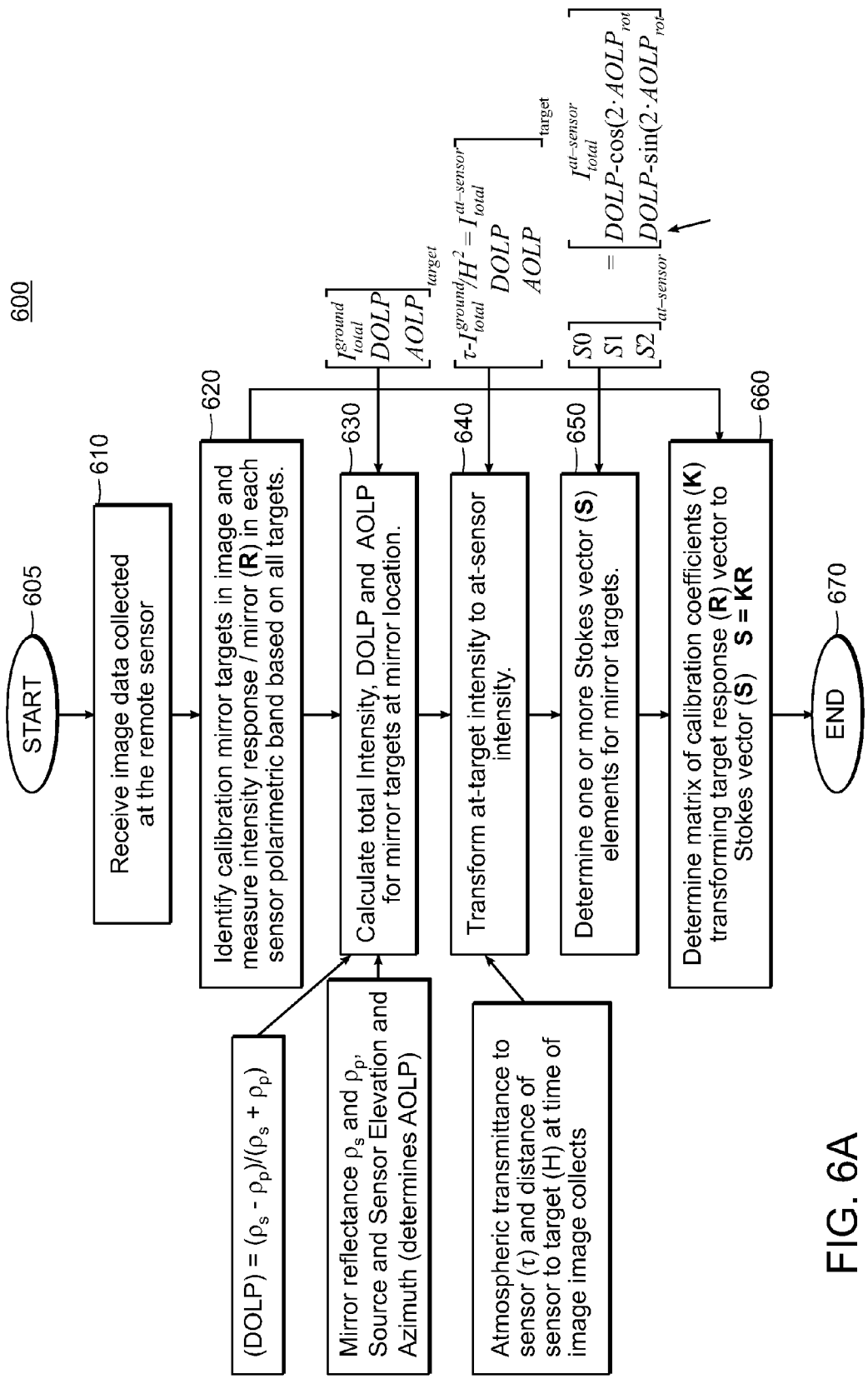
FIG. 6A is a flowchart of an exemplary method for calibrating an imaging polarimeter.
Figure 6B:
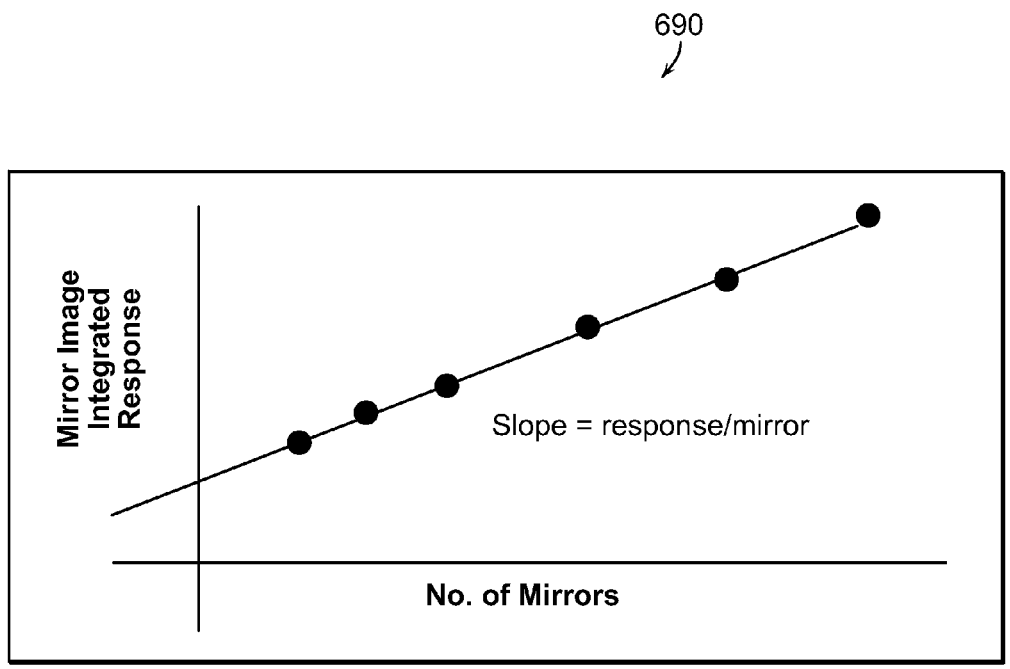
FIG. 6B illustrates a graph that demonstrates a measurement of a response in a sensor band (e.g., response/mirror) using multiple mirror targets.

FIG. 6A is a flowchart of an exemplary method 600 for calibrating an imaging polarimeter. At 605, the method 600 begins. At 610, the method 600 receives image data collected at a remote sensor. At 620, the method 600 identifies calibration mirror targets in the image data and measures an intensity response per mirror (R) in each sensor polarimetric band on all mirror targets. For instance, FIG. 6B illustrates a graph 690 that demonstrates an average sensor response for a sensor band (e.g., response/mirror) based on mirror targets where each target contains a different number of mirrors. The method 600, at 630, then calculates the total intensity, DOLP and AOLP for the mirror targets. For instance, DOLP may be calculated using the equation: $(DOLP)=(\rho_s-\rho_p)/(\rho_s+\rho_p)$, where $\rho_s$ and $\rho_p$ are the orthogonal reflectance components of the reflected radiation, respectively parallel and perpendicular to the mirror surface. AOLP is determined based on mirror reflectance $\rho_s$ and $\rho_p$, and the elevation and azimuth of the radiation source and remote sensor. In particular, the following equation may be utilized:

$$\begin{bmatrix} I_{total}^{ground} \\ DOLP \\ AOLP \end{bmatrix}_{target}$$

where $I_{total}^{ground}$ equals the upwelling intensity from the mirror such that $I_{total}^{ground}=I_s+I_p$ and $$I_{(s\ or\ p)} = \rho_{s\ or\ p}\tau_1 E_o \left(\frac{R}{2}\right)^2$$

Where,
$\rho_{s\ or\ p}$=specular reflectance of s or p polarization component
$\tau_1$=Sun to mirror reference target transmittance
$E_o$=Top-of-Atmosphere Solar irradiance
R=Mirror radius of curvature At 630, the method 600 transforms at-target intensity to at-sensor intensity. For example, the method 600 utilizes information based on atmospheric transmittance to sensor ($\tau_2$) and distance of sensor to target (H) at a time associated with collecting image data. An equation that may be used is as follows:

$$\begin{bmatrix} \tau_2 \cdot I_{total}^{ground} / H^2 = I_{total}^{at-sensor} \\ DOLP \\ AOLP \end{bmatrix}_{target}$$

where $I_{total}^{at-sensor}$ is the intensity of radiation reaching the sensor normalized by the inverse square law and equivalent to the incident irradiance at the input aperture of the remote sensor from the reference mirror target.

Subsequently, method 600, at 650 determines one or more Stokes vector (S) elements for the mirror targets. In particular, method 600 uses the following equation:

$$\begin{bmatrix} S0 \\ S1 \\ S2 \end{bmatrix}_{at-sensor} = \begin{bmatrix} I_{total}^{at-sensor} \\ DOLP \cdot \cos(2 \cdot AOLP_{rot}) \\ DOLP \cdot \sin(2 \cdot AOLP_{rot}) \end{bmatrix}$$

where $AOLP_{rot}$ is the target AOLP rotated by the angle from the specular surface plane of incidence to the sensor focal plane scan direction.

At 660, method 600 determines a matrix of calibration coefficients (K) that is used for transforming the target response (R) vector to a Stokes vector (S) using the matrix equation: S=KR. At 670, the method 600 ends. Once the calibration coefficients are determined this matrix calculation transforms the response vector (R) of any target in the scene into a corresponding Stokes vector (S) providing calibrated elements and metrics.

Figure 7:
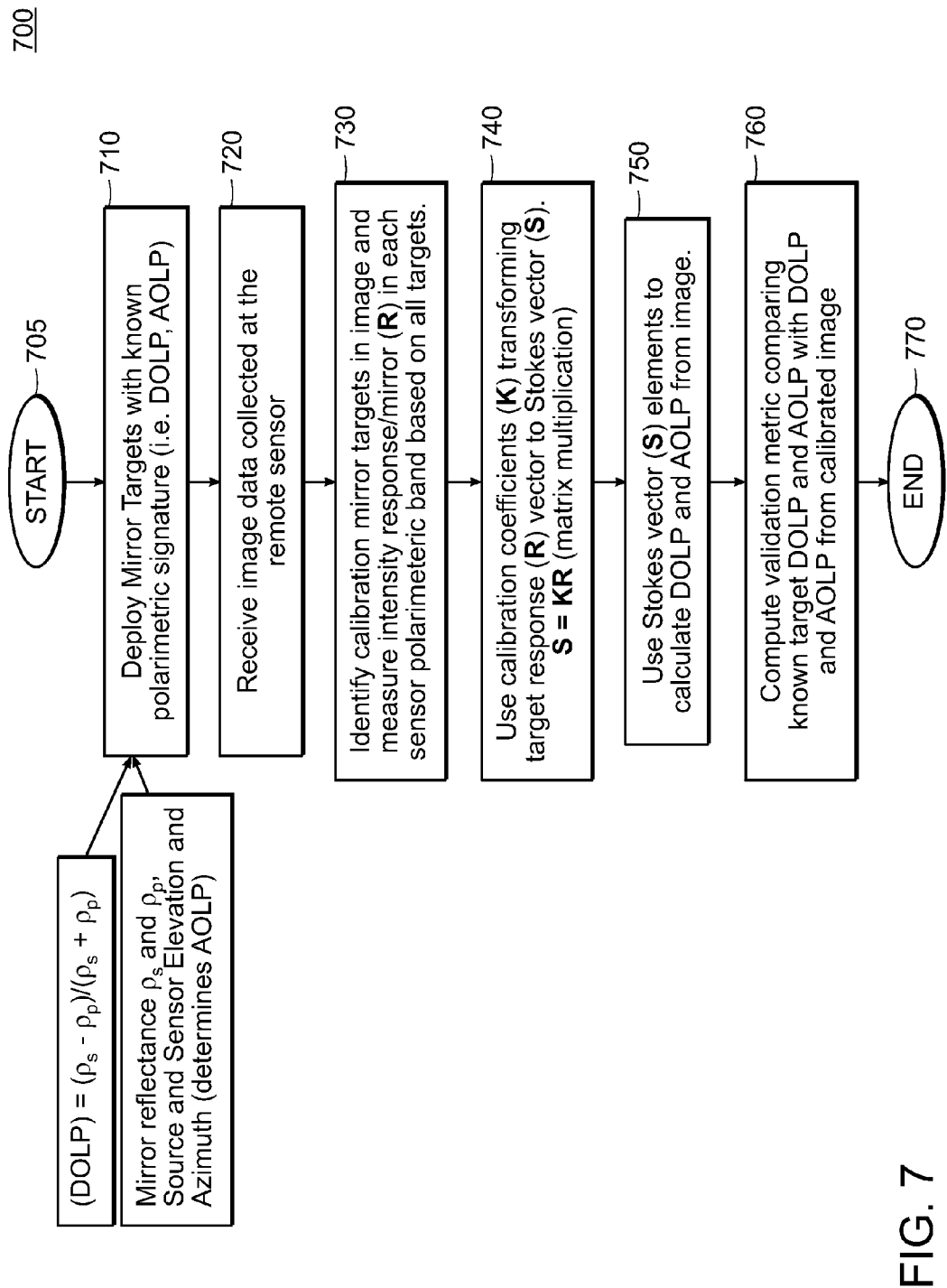
FIG. 7 is a flowchart of an exemplary method for validating the performance of an imaging radiometer.

FIG. 7 is a flowchart of an exemplary method 700 for validating the performance of an imaging radiometer. At 705, method 700 begins. At 710, method 700 deploys mirror targets with known polarimetric signatures (e.g., DOLP and AOLP). DOLP and AOLP is determined as described above in reference to FIG. 6A. The mirrors are spaced sufficiently so that the target image point spread functions (PSFs) do not overlap. The spacing may depend on the sensor's ground sample distance. At 720, method 700 received image data that is collected at a remote sensor. The method 700, at 730, identifies calibration mirror targets in the image data and measures an intensity response per mirror (R) in each sensor polarimetric band on all mirror targets. For instance, FIG. 6B illustrates a graph 690 that demonstrates the intensity (e.g., response/mirror) of all mirror targets. At 740, method 700 uses calibration coefficients (K) to transform a target response (R) vector to a Stokes vector (S) using the equation: S=KR (e.g., matrix multiplication). Subsequently, method 700, at 750, uses the Stokes vector (S) elements to calculate DOLP and AOLP from the image data. At 760, method 700 computes a validation metric by comparing known target DOLP and AOLP with DOLP and AOLP determined from the calibrated image data. At 770, method 700 ends. Completing this process enables the assessment of the "polarization sensitivity" of the remote sensor (i.e. to check what happens when the sensor views a polarized target). If the sensor is perfect (i.e. 0% polarization sensitivity), then the data it produces is the same regardless of the input light polarization. If the sensor is imperfect, then the variation in data response with changes in polarization quantify the percent polarization sensitivity (mathematically defined as (S_max−S_min)/(S_max+S_min)*100, where S_max is the maximum signal response over all input polarization states, and S_min the minimum signal response over all input polarization states).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A mirror array for polarimetric calibration of a remote sensor, comprising:
    a plurality of reflective mirrors configured and arranged to reflect neutral or polarized radiation from a source of radiation onto the remote sensor,
    wherein each of the plurality of reflective mirrors having a radius of curvature, the radius of curvature configured to generate reflected light at a known diversity of polarization states and s and p reflectance and control an intensity of the reflected radiation, and
    wherein the reflected radiation is utilized to calibrate a remote sensor based on a known at-sensor intensity for each of the plurality of reflective mirrors and subject polarization state of the known diversity of polarization states of the reflected radiation for the respective reflective mirror.

2. The array of claim 1, wherein one or more of the plurality of reflective mirrors comprise a circular polarization filter/retarder, a linear polarization filter, a polarization orientation filter, or any combination thereof.

3. The array of claim 1, wherein each of the plurality of reflective mirrors are polarized to a different set of polarization metric values.

4. The array of claim 1, wherein each of the plurality of reflective mirrors having a radius of curvature, the radius of curvature providing control of an upwelling intensity of the reflected radiation.

5. The array of claim 1, wherein one or more of the plurality of reflective mirrors are a convex spherical mirror.

* * * * *